Figure 1:
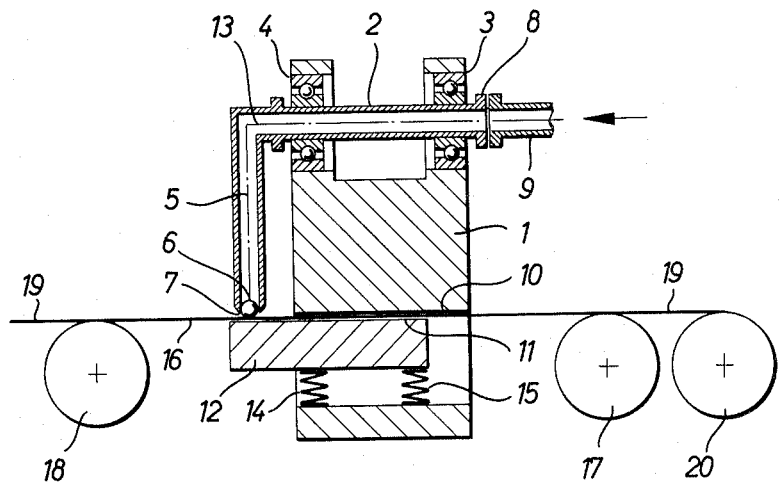

July 12, 1966 W. KIRCHNER 3,261,021
METHOD FOR RECORDING A CONTINUOUS TRACE
OF A SUCCESSION OF MEASURED VALUES
Filed April 18, 1963 2 Sheets-Sheet 1

Inventor
Willi Kirchner
By Stevens, Davis, Miller & Mosher
Attorneys

United States Patent Office 3,261,021
Patented July 12, 1966

3,261,021
METHOD FOR RECORDING A CONTINUOUS TRACE OF A SUCCESSION OF MEASURED VALUES
Willi Kirchner, Schwebheim, Obere Heide, Germany, assignor to Kugelfischer Georg Schafer & Co., Schweinfurt, Germany
Filed Apr. 18, 1963, Ser. No. 273,921
Claims priority, application Germany, Apr. 19, 1962, K 46,534
2 Claims. (Cl. 346—1)

This invention relates to a method for recording a continuous trace of a succession of measured values whereby the record trace is produced by the pressure exerted on a suitable recording medium by a recording member. In many applications it is not sufficient to have the instantaneous values of measured quantities indicated by instruments, as such a method will not afford the required full interpretation of the test results as a function of time. What is actually required for subsequent interpretation of measured values or test results is a permanent record of a continuous trace of a succession of readings. An example of such an application in which recording instruments are used almost exclusively is the continuous testing of the surface as well as the shape of workpieces. A suitable recording system essentially includes a recording mechanism, a measuring system driving the recording mechanism, and a pickup receiving signals indicating the magnitude of the quantity to be measured, the pickup being in most cases arranged to amplify said signals before they are transmitted to the measuring system. There have already been proposed a variety of recording mechanisms including, for example, ink recorders, light spot recorders, spark recorders, recorders using a heated stylus co-operating with wax paper, etc. However, each of these systems has its inherent drawbacks. In an ink recorder, for example, the capillary recording pens are prone to clogging. A drawback of other systems is to be seen in the fact that they require the use of expensive recording media such as photographic paper, wax paper, spark recording paper and the like. In still another system the drawback of using an expensive recording medium is avoided by the use of plain note paper in conjunction with carbon paper. In this system, the two sheets are simultaneously drawn over an edge, and the movable needle of the measuring system is urged against the edge, thus causing the carbon paper to produce an impression on the note paper strip. One drawback of this system lies in the fact that the movable needle is subject to considerable static friction. Attempts have been made to cause the needle to vibrate and thus to eliminate the effect of static friction. However, the vibrating needle produces a very broad record trace rendering small differences in the magnitude of the measured quantity indistinguishable.

According to the present invention, the aforementioned drawbacks of the method in which a continuous trace of a succession of values is recorded by the pressure of a recording member against the record carrier is avoided by providing for the pressure required to make a record to be produced by a freely movable ball supported by an air cushion. According to a specific feature of the invention, the ball producing the recording pressure is disposed, with a certain amount of clearance, in a tubular stylus member extending perpendicular to the recording medium and mounted for rotation about an axis extending at right angles to the direction of the recording pressure, the arrangement of the ball being such that the compressed air introduced into the tubular stylus member not only flows past the ball but also continuously urges the ball against the recording medium. It is convenient to use a conduit for supplying the compressed air, which conduit is not in physical contact with the tubular stylus member.

Figure 2:
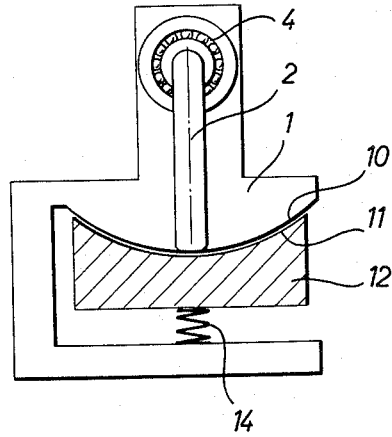
Figure 3:
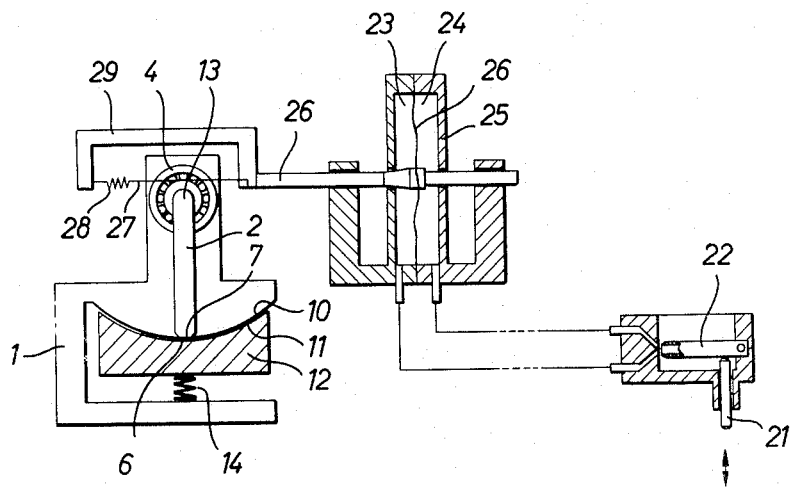

Other objects and features of the invention will become apparent as the description proceeds, especially when taken in conjunction with the accompanying drawings, illustrating a preferred embodiment of the invention, wherein:

FIG. 1 is a diagrammatic longitudinal cross-sectional view of the device of the invention;
FIG. 2 shows the front view of the device of FIG. 1;
FIG. 3 shows the device of FIG. 1 in conjunction with a pneumatic measuring system and a nozzle-type pickup, the two units being shown in longitudinal section.

As will be seen in FIG. 1, an angular stylus member 2 is supported for rotation in two ball bearings 3 and 4 mounted in a frame member 1. Disposed in the bore 5 of the stylus member 2 is a recording member in the form of a ball 6, part of the ball projecting from the lower end 7 of the stylus member. The diameter of ball 6 is slightly smaller than that of bore 5. Adjacent to the rear end 8 of the stylus member 2 is a tube 9 serving to introduce compressed air into the stylus member, the compressed air continuously urging the ball 6 against the recording medium to produce a trace. In order to avoid distortion of the record trace, such as might occur when there were a physical connection between the tube 9 and the stylus member 2 so that additional turning moments could be imposed on the stylus member, it is preferred to introduce the compressed air from the tube 9 into the stylus member 2 in such a manner as to avoid physical contact between the members 9 and 2. The under side 10 of frame 1 and the upper side 11 of a member 12 supporting the recording medium are formed as part-cylindrical surfaces whose common axis coincides with the pivotal axis 13 of stylus member 2. Compression springs 14 and 15 urge the supporting member 12 towards the under side 10 of frame 1. The record carrier is guided between the under side 10 of frame 1 and the upper side 11 of supporting member 12. The record carrier comprises an elongated sheet of carbon paper 16 which is fed from a reel 17 to a reel 18, and an elongated sheet of writing paper 19 which is pulled off a reel 20. The drive means for the record carrier is not shown and will not be described, as it forms no part of the invention.

The aforedescribed device operates as follows: The air under pressure introduced into the stylus member 2 from tube 9 continuously urges ball 6 against the writing paper strip 19 supported by the upper side 11 of supporting member 12. Part of the air under pressure flows past ball 6 so that the ball is supported in an almost frictionless manner by an air cushion. When the stylus member is pivoted about its pivotal axis 13 by a driving force produced by any suitable measuring mechanism, and when the record carrier 16, 19 is simultaneously fed past the stylus member, the ball 6 which is loaded by the pressure of the air flow will continue to roll on the paper strip 19 and will produce a continuous chart or record of the continuous succession of test values.

The measuring mechanism driving the stylus member 2 may be of the mechanical type or of the electric type. It is particularly convenient to use a pneumatic measuring mechanism in view of the fact that air under pressure must be available in any event for the operation of the recording mechanism. The pneumatic measuring mechanism is operated by a pneumatic pickup. Preferably use is made of a pickup incorporating a jet or nozzle, as the large air output of such a pickup ensures rapid response of the measuring mechanism and thus permits the recording of rapidly varying test data.

In the arrangement shown in FIG. 3, a feeler pin 21 serves to measure the quantity under consideration. The feeler pin drives a pivotally mounted nozzle 22, the arrangement being such that, depending on the position of nozzle 22, different pressures are developed in the chambers 23 and 24 of the pneumatic measuring mechanism 25. This difference in pressure causes a corresponding axial displacement of valve needle 26 and also causes a corresponding angular motion of the stylus member 2 to which the valve needle is connected by means of a ribbon 27. The ribbon 27 is wrapped around the stylus member, and it is tensioned by a spring 28; both ends of the ribbon are attached to a yoke 29 which is in turn rigidly secured to the valve needle 26. The means for guiding the yoke 29 is not shown in the drawings.

What is claimed is:

1. Method for recording a continuous trace of a succession of measured values on a recording medium comprising directing a flow of compressed air against a recording device in contact with said recording medium, moving said medium past said device and simultaneously displacing said device in a direction lateral to the direction of movement of said medium to form a continuous trace on said medium of said displacements.

2. Method for recording a continuous trace of a succession of measured values on a recording medium comprising directing a continuous flow of compressed air against a recording device in contact with said recording medium, continuously moving said medium under said device in contact therewith, continuously transmitting measurements to said device and variably displacing said device in accordance with said transmissions in a direction lateral to the direction of movement of said medium to form a continuous trace on said medium of said displacements.

References Cited by the Examiner

UNITED STATES PATENTS

| | | | |
|---|---|---|---|
| 1,843,572 | 2/1932 | MacGahan | 346—1 |
| 2,139,508 | 12/1938 | Marcellus | 346—75 |
| 2,315,348 | 3/1943 | O'Brien | 346—139 |
| 2,358,102 | 9/1944 | Robertson | 346—77 |
| 2,484,298 | 10/1949 | Krahulec | 346—139 |
| 2,511,195 | 6/1950 | Buhrendorf et al. | 346—139 |
| 2,628,881 | 2/1953 | Adams | 346—1 |
| 3,018,153 | 1/1962 | Steen | 346—139 |
| 3,051,956 | 8/1962 | Theobald | 346—141 |
| 3,063,050 | 11/1962 | Millis | 346—1 |
| 3,149,901 | 9/1964 | Hagelbarger | 346—77 |

LOUIS J. CAPOZI, *Primary Examiner.*

LEYLAND M. MARTIN, LEO SMILOW, *Examiners.*

J. W. HARTARY, *Assistant Examiner.*